Patented Feb. 8, 1927.

1,616,533

UNITED STATES PATENT OFFICE.

ERICH KRAUSE AND KOLOMAN RÓKA, OF KONSTANZ, GERMANY, ASSIGNORS TO THE FIRM OF HOLZVERKOHLUNGS-INDUSTRIE AKTIEN-GESELLSCHAFT, OF KONSTANZ (BADENIA), GERMANY, A CORPORATION OF NEW YORK.

MAKING FORMALDEHYDE FROM METHYLENE CHLORIDE.

No Drawing. Application filed September 1, 1922, Serial No. 585,802, and in Austria September 17, 1921.

To produce formaldehyde from methylene bromide by heating with water under pressure is known.

The attempt to produce formaldehyde from methylene chloride was not successful owing to the well known inactivity of the alkylene chlorides and further as, under the prevailing conditions of reaction, the formaldehyde which had been produced would probably disappear owing to the well known capability of the substance to react easily. According to the experiments of André, Comptes Rendus volume 102, 1886, pages 1471–76 and Wiener Monatshefte für Chemie, vol. 24, 1903, pages 785–787, in which methylene chloride had been heated for some time with water to 180° C., $CO, HCl, CH_3Cl$ had been formed.

We have found that the production of formaldehyde from methylene chloride with almost quantitative yield is possible if methylene chloride is heated in the presence of water at temperatures of about 140 to about 170° C.

Example.

10 kilograms of methylene chloride are heated with 100 kilograms of water in an autoclave of acid proof material for 10 hours at 140–160° C. An approximately 1.3% solution of formaldehyde is thus produced. Taking into consideration the methylene chloride which has been left over after the reaction and which can be easily recovered, the output will therefore be about 92% of the output which could be obtained theoretically. By agitating the liquid, for instance with the aid of a stirring device, the reaction may be accelerated.

One form of the invention consists in working in the presence of acid fixing substances, this presenting, amongst others, the advantage, that formaldehyde solutions of a higher concentration can be produced.

Acid fixing substances, as for instance calcium carbonate, ferric hydroxide, aluminium hydroxide, sodium acetate, and sodium phosphate which do not act upon the formaldehyde which is formed, can be introduced into the reaction vessel either in the required quantity before the beginning or in portions during the process.

If substances are used which, as for instance alkali-metal hydroxide, sodium carbonate, lead oxide, ammonia and other neutralizing substances, are capable of acting upon the formaldehyde, it is advisable not to add the total quantity of acid fixing substances from the beginning but gradually, either continuously or in portions. The addition is preferably regulated so that the reaction liquid is maintained in general weakly acidic or neutral in reaction. Working in solutions of alkaline reaction is therefore to be avoided as much as possible.

We claim:

1. A process for the production of formaldehyde consisting in heating methylene chloride in the presence of water in a closed vessel at temperatures of from 140° C. approximately to 170° C. approximately.

2. A process for the production of formaldehyde consisting in heating methylene chloride in the presence of water and of substances which are capable of neutralizing the hydrochloric acid formed without decomposing substantial amounts of the formaldehyde in a closed vessel at temperatures of from 140° C. approximately to 170° C. approximately.

3. A process for the production of formaldehyde consisting in heating methylene chloride in the presence of water and sodium acetate in a closed vessel at tempertures of from 140° C. approximately to 170° C. approximately.

In testimony whereof we have signed our names to this specification.

ERICH KRAUSE.
KOLOMAN RÓKA.